INVENTOR.
Ralph G. Lyall
BY
ATTORNEY

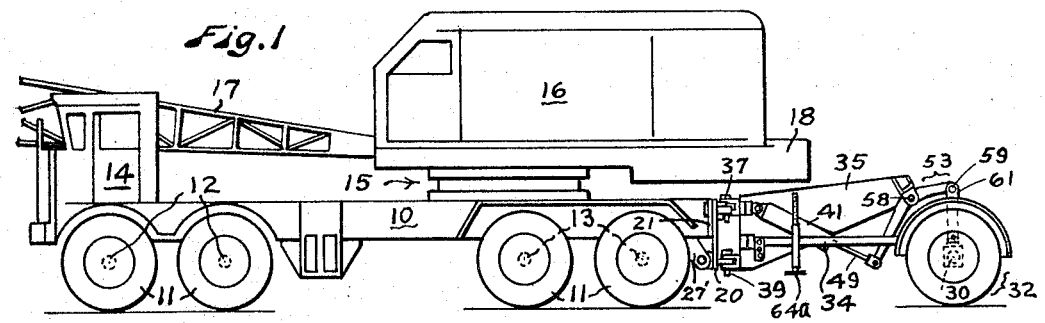
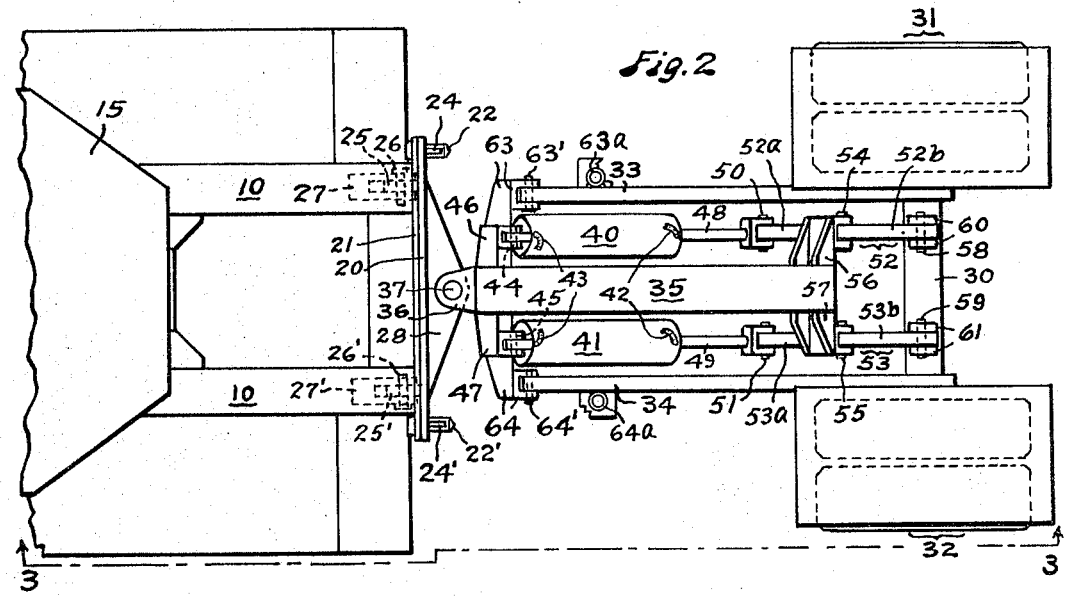
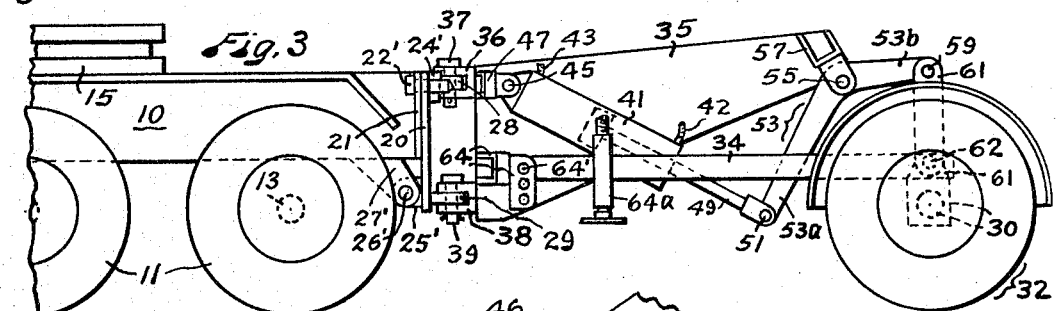
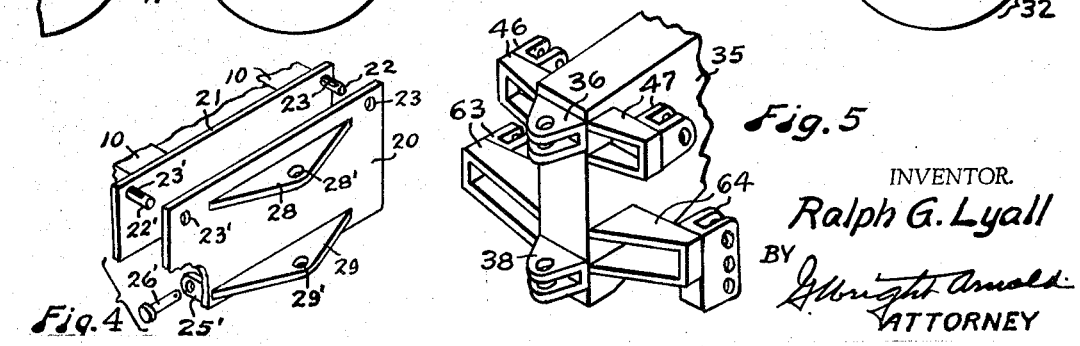

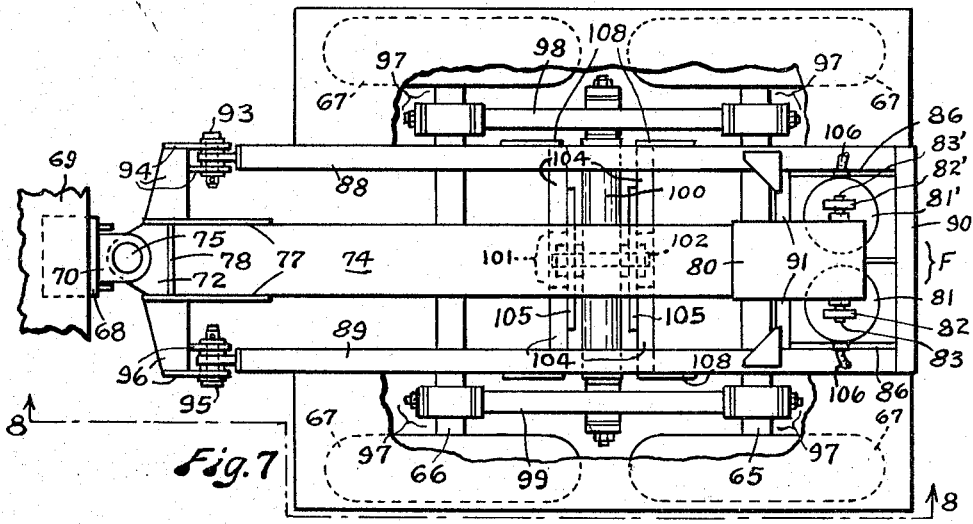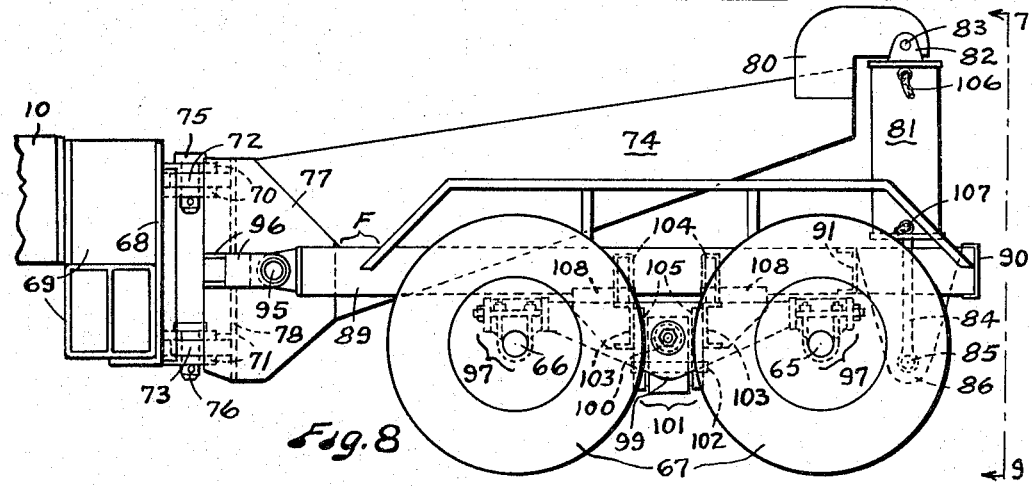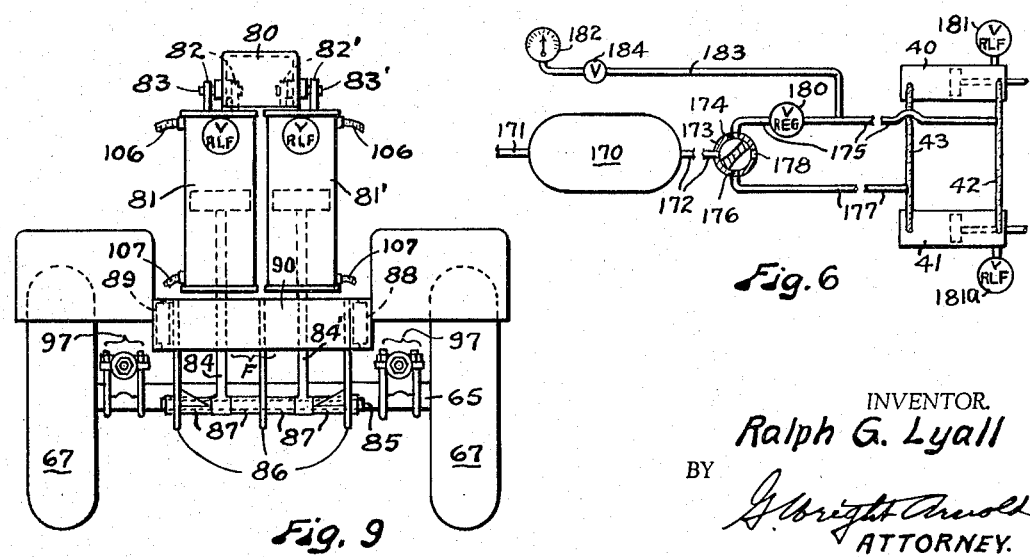

United States Patent Office 3,298,706
Patented Jan. 17, 1967

3,298,706
AXLE LOAD DISTRIBUTING DEVICES FOR USE WITH HEAVY MOTOR VEHICLES AND EQUIPMENT
Ralph G. Lyall, 5900 2nd Ave. S., Seattle, Wash. 98108
Continuation of application Ser. No. 204,478, June 22, 1962. This application May 24, 1965, Ser. No. 465,816
15 Claims. (Cl. 280—81)

This application is a continuation of my prior application, similarly entitled, Ser. No. 204,478, filed June 22, 1962, now abandoned.

My invention relates to axle load distributing devices for use with heavy motor vehicles and equipment, such as motor cranes, for illustration and not limitation, to reduce rear axle loads and to distribute axle loads generally and spread them over greater distances, i.e., greater wheel base.

My present invention is in the nature of a further development of the axle load distributing mechanism disclosed in my prior Patent No. 2,974,976. For purpose of illustration it is herein disclosed as applied to a motor crane, but it will be understood that it may be applied to substantially any vehicle designed to carry a heavy load in complying with varying legal highway load requirements.

Axle loads permissible on highways, and distances or spread between axles carrying specified loads, are, in most instances, regulated by laws and ordinances. With heavy mobile equipment, and particularly with equipment of the type wherein most of the load is on the rear axle or axles, this sometimes makes it impossible to legally move the equipment on the highway or street without dis-assembling it and moving parts of the dis-assembled equipment on separate vehicles, a procedure which is time consuming and expensive.

A general object of my invention is to provide a wheel supported extension frame which is readily attachable to and detachable from the rear end portion of the main frame of a heavy mobile vehicle and is capable of being used in such a manner as to take a known and adjustable percentage of the load off of the rear axle or axles of the mobile vehicle and, at the same time, transfer some of said load from the rear axle or axles to the front axle of the mobile vehicle by extending the wheel base, thus to conform to the traffic laws by a distribution of the load on the axles.

Another object of my invention is to provide load distributing devices of this type wherein pneumatic cylinders are used to transfer load from the main vehicle axles to those of the attachment, said pneumatic cylinders being relatively long so that they afford an ample range of movement to take care of both rough and uneven roadbed and angular variations in a vertical plane between the mobile vehicle and the supporting axles of the ground engaging wheels which occur when the mobile vehicle and attachment are moving over pavement or roadbed in which sharp breaks occur, such as at the crest of a rise or the trough of a dip in a highway or street, or rough unpaved ground.

Another object is to provide load distributing devices of this type using pneumatic cylinders which function both as air springs or air suspension means in cushioning and absorbing shocks, and as load distributing means by depressing the rear axle or elevating the same with respect to the ground or highway.

Other objects are to provide load distributing devices of this type which can use either a single load distributing axle or dual or multiple load distributing axles.

A special further object of my invention is to provide a load distributing axle which will trail or track and eliminate scuffing of the rubber of the tires which constitutes an expensive feature with the very heavy loads involved.

The above mentioned general objects of my invention, together with others inherent in the same, are attained by the mechanism illustrated in the accompanying drawings, the same being preferred exemplary forms of embodiment of my invention, throughout which like reference numerals refer to like parts.

FIGURE 1 is a view in side elevation of a mobile crane which is equipped with a single axle type axle load distributing device constructed in accordance with my invention, said load distributing device including pneumatic cylinders.

FIG. 2 is a plan view on a larger scale than FIG. 1 showing this axle load distributing device and the rear end portion of the mobile crane.

FIG. 3 is a side elevation looking in the direction of broken line 3—3 of FIG. 2.

FIG. 4 is an exploded, fragmentary isometric view showing a fragment of the rear end portion of a mobile vehicle and a frame, together with a mounting plate for my attachment and means for releasably securing the mounting plate to the vehicle.

FIG. 5 is a fragmentary isometric view of the forward end portion of a cantilever beam which is adapted to be attached to the mounting plate shown in FIG. 4.

FIG. 6 is a diagram showing pneumatic control means used in connection with the axle load distributing devices shown in FIGS. 1 to 5 and also the devices shown in FIGS. 7, 8 and 9.

FIG. 7 is a plan view, with parts broken away, showing a dual axle type axle load distributing device constructed in accordance with my invention.

FIG. 8 is a side elevation of said dual axle device looking in the direction of broken line 8—8 of FIG. 7.

FIG. 9 is an end view of said dual axle device looking in the direction of broken line 9—9 of FIG. 8.

Figure 10:
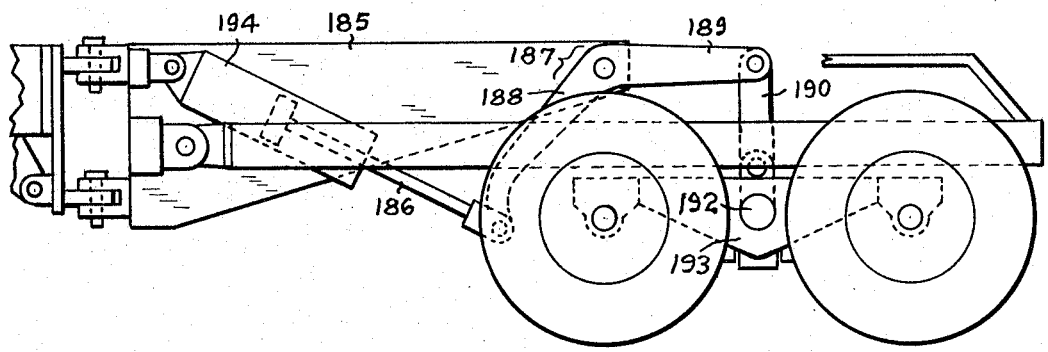
FIG. 10 is a view in side elevation of my invention applying the fluid cylinder to the bell crank lever arms which engage the cross member bearing on the walking beams on each side of an extension.

The mobile crane, FIG. 1, in connection with which my load distributing device is shown for purpose of illustration, comprises a vehicle frame 10 mounted on wheels 11 by dual front axles 12 and dual rear axles 13. The usual driver's cab 14 is supported by the front end portion of the vehicle frame 10 and the usual turntable 15 is supported on said frame 10 toward the rear end thereof and in a position which places the major portion of the weight said turntable carries on the dual rear axles 13. A conventional crane cab 16, which contains the usual crane operating machinery, is mounted in the turntable 15 and carries a boom 17 and a counterweight 18, which are disposed in counterbalancing relation in the usual manner.

In accordance with my invention my axle load distributing device is detachably connected with the rear end portion of the vehicle frame 10 and is designed to take a portion or percentage of the load off of the dual rear vehicle axles depending on the degree of air pressure employed and at the same time to transfer some of this load to the front axles 12. In vehicles of this type the load on the front axles 12 will usually be well below the legal limit at the time the load on the rear axles 13 reaches or exceeds the legal limit. Also in accordance with my invention the rear end of the vehicle frame 10 is provided with suitable attachment means to receive the axle load distributing device as will now be described. This attachment means includes a mounting plate 20 rigidly secured by any suitable means to the rear end of the vehicle frame 10. In the instance shown in FIGS. 1 to 5 the vehicle frame 10 carries a rigidly attached plate 21, against which the mounting plate 20 rests. Two stud pins 22 and 22' are rigid with the plate 21 adjacent the respective ends and adjacent the upper edge of said plate 21. The pins 22 and 22' extend through suitable holes 23 and 23' in mounting plate 20 and said pins are slotted to receive flat taper keys 24 and 24' which wedgingly secure the mounting plate 20 to the frame plate 21. The lower corner portions of the mounting plate 20 have rigid lugs 25 and 25' thereon, which are removably attached by pins 26 and 26' to brackets 27 and 27'. The brackets 27 and 27' are rigid with the frame 20. The plate 21 and pins 22 and 22' and brackets 27 and 27' are permanent parts of the frame of the mobile vehicle and are utilized to hold mounting plate 20.

Two shelf like horizontal bracket plates 28 and 29 are welded or otherwise rigidly secured to the mounting plate 20 near the respective upper and lower edges of said mounting plate. These two bracket plates 28 and 29 taper toward their outer ends for obvious clearance purposes in turning and the wider medial portions of said two bracket plates are respectively provided with vertically aligned perforations 28' and 29'.

My axle load distributing device, which is connected with the vehicle frame 10 by the parts just hereinbefore described, may be either a single axle type, as shown in FIGS. 1 to 5 or a dual axle type, as shown in FIGS. 7, 8, 9 and 18.

The single axle device shown in FIGS. 1 to 5 comprises a single transverse load distributing axle 30 having two dual wheels 31 and 32 rotatively supported at the respective ends thereof. Two spaced apart torsion or side frame bars 33 and 34 are rigidly secured to the transverse axle 30 inwardly from the wheels 31 and 32 and extend forwardly therefrom.

The load carried by the axle 30 is transmitted to it through a rearwardly extending, upwardly inclining cantilever member 35 which is connected with the axle member 30 by pneumatic cylinder and lever means hereinafter described. Preferably the cantilever member 35 is of hollow, fabricated steel construction in the interest of maximum strength and minimum weight. The forward or butt end of the cantilever member 35 is connected with the rear end portion of the vehicle frame 10 in such a manner as to allow for sidewise swinging movement but no vertical swinging movement of said member 35 relative to the vehicle frame 10. The devices shown in FIGS. 1 to 5 for making this connection between the member 35 and the mounting plate 20 comprise an upper U-shaped bracket 36 which is welded or otherwise rigidly attached to the forward end of member 35, near the upper edge of said member and extends toward the mounting plate 20 and fits over the bracket plate 28 and is detachably connected with said bracket plate 28 by a vertical pivot member 37. A lower bracket 38 is welded or otherwise rigidly secured to the forward end of member 35 near the lower edge of said member 35 and is connected by a vertical pivot member 39 with the lower bracket plate 29. The two pivot members 37 and 39 have their axes in vertical alignment with each other so that they provide in effect a single pivot axis which allows sidewise swinging movement of the cantilever member 35, but not vertical movement of the cantilever 35. Preferably two members 37 and 39 are used instead of a single pin which in some cases would be too heavy for convenient manual handling while aligning or positioning the extension. Obviously, ball and socket means may be substituted for pins 37 and 39 and associated brackets, provided such are organized to allow side swing movement but not vertical movement of cantilever 35. With ball and socket means, or other pivotal arrangements, such as spaced vertical pins, or one elongated vertical pin, it is important to have vertically spaced regions of pivotal connection connecting upper and lower portions of the butt end of the cantilever to the vehicle frame, if up and down swinging movement of the cantilever relative to the frame is to be prevented effectively, such prevention of up and down movement being necessary if the cantilever is to perform effectively its function of constituting in the organization a stiff reinforcing spine extending rearwardly of the vehicle frame.

The pneumatic cylinder and lever means by which the axle 30 is connected with the rear end portion of the cantilever member 35 is in duplicate at the two sides of said member. Instead of the preferred pneumatic cylinder, hydraulic means may be employed or substituted but of course, the response in maintaining constant pressure would not be nearly as quick. A third obvious arrangement could be a combination of hydraulic and pneumatic pressure means, that is, hydraulic medium could be made to react against or cushioned by a pneumatic pressure. The cylinders 40 and 41 may be mounted on the cantilever member at any desired angle. Also, it is obvious any reference herein to a pressure cylinder would be applicable in some instances to some degree to air bag, as where expansion pressure is applied between parts. Since the space available for mounting the cylinder is limited in some instances, a single cylinder may be all that would be required and would suffice to meet the conditions imposed. These conditions involve the amount of the load to be transferred and the traffic regulations. The leverage advantage together with the characteristics of valve action determines the quickness of response. The shock loads will vary according to the road conditions and the road speeds.

Two pneumatic cylinder assemblies 40 and 41 are positioned adjacent the respective sides of the cantilever member 35 parallel with said member and having their respective ends connected with suitable air pressure supply hoses 42 and 43 through which air under pressure may be admitted to and exhausted from the cylinders 40 and 41 to provide for synchronous operation of pistons within said cylinders 40 and 41. The forward ends of the cylinders 40 and 41 are respectively connected by pivots 44 and 45 with brackets 46 and 47 which extend transversely from and are rigidly secured to the adjacent forward end portion of the cantilever member 35. The cylinder assemblies 40 and 41 include the usual pistons together with rearwardly extending piston rods 48 and 49, respectively. The rear ends of the piston rods 48 and 49 are respectively connected by pivots 50 and 51 with the lower ends of downwardly extending arms 52a and 53a of bell crank levers 52 and 53. The bell crank levers 52 and 53 also have rearwardly extending arms 52b and 53b. Also, the air bags may be substituted for bell cranks 52 and 53 and cylinders 40 and 41 and links 60 and 61, that is, between the rear end portion of cantilever 35 and axle 30 (see FIG. 11). The bell crank levers 52 and 53 are respectively fulcrumed by pivot members 54 and 55 on brackets 56 and 57 which are rigid with the rear end portion of the cantilever member 35 and extend transversely therefrom. The rearwardly extending arms 52b and 53b of bell crank levers 52 and 53 are respectively connected by pivot members 58 and 59 with the upper ends of links 60 and 61. The lower end of each links 60 and 61 is connected by a pivot member 62, one of which is shown by dotted lines in FIG. 3, with the axle 30. Provision for a substantial amount of vertical movement between the axle 30 and the cantilever member 35 is desirable and this is provided by the pneumatic cylinder assemblies 40 and 41. The relative length of the arms of the bell crank levers 52 and 53, together with the size of the cylinders 40 and 41, can be designed to meet requirements of load distribution in providing mechanical advantage or leverage. The pneumatic unit either a cylinder or air bag, is transposed between the load distributing axle or axles and the rear end of the cantilever either through the means of a bell crank or directly connected thereto. The pneumatic unit, either a cylinder or an air bag is connected directly or through suitable leverage to the load distributing axle or axles. That these axle or axles maintain or assume constantly and uniformly their portion of the load is a most important function of the invention. The value of the invention for the most part is based on the reliability of the device to provide such constant load assumption by the load distributing axle or axles.

The forward ends of the torsion or side frame bars 33 and 34 are respectively connected by horizontal pivot members 63' and 64' with brackets 63 and 64. Bracket 64 may be provided with vertically spaced apart extra holes in order to adjust for difference in size of tires of the vehicle and thereby render the torsion bar 34 substantially horizontal. The brackets 63 and 64 are rigid with and extend transversely in opposite directions from the forward end portion of the cantilever member 35. Preferably the edges or parts of the brackets 63 and 64 adjacent to the mounting plate 20 are inclined to allow more clearance between these brackets and said plate 20.

Admission of air pressure to the rear ends of cylinders 40 and 41 through hoses 42 will tend to move the load distributing axle 30 downwardly relative to the cantilever member 35 thus transferring load from the rear vehicle axles 13 to said load distributing axle 30 and at the same time transferring some load to the front vehicle axles 12.

This extension is not merely an attachment joined to the mobile vehicle by a vertical pin but comprises mechanism of at least one single unitary axle extending entirely across the width of the vehicle or load distributing attachment with at least two road engaging wheels, said extension being held rigid with respect to vertical movement yet laterally movable as regards the mobile frame. Also, said attachment, while permitting vertical movement of the load distributing axle, confines such vertical movement within a limited range and said attachment is subject to having imposed thereon a predetermined portion of the load which otherwise would be carried by the mobile vehicle wheels. Also, the distance between the vertical pin and the load distributing axle is sufficient to prevent wobbling or shimmying of the wheels and rubber scuffing, the said distance being at least of the order of four feet or more. Thus, this extension mechanism avoids any castering action of the wheels and heavy vibration developed when the wheels engage railroad tracks. It is to be noted that the reason for using a cylinder in place of the air bag is to get more vertical movement between the axle and the cantilever member that is, where an extensive vertical movement is necessary. Also, the stroke of the fluid piston in the cylinder depends or is controlled by the permitted distance between the midway point between the axles 13 and the center of axle 30 FIG. 1. In FIG. 8 it would be the distance between shaft 100 and midway between the axles 13.

FIG. 6 shows pneumatic control means which may be used in connection with the pneumatic cylinders 40 and 41 shown in FIGS. 1, 2 and 3. Said FIG. 6 shows a compressed air reservoir 170 which receives air under pressure from any suitable source through an air inlet conduit 171 and is connected by an air outlet conduit 172 with a two way control valve 173. The two way control valve 173 has one port 174 connected by a run of conduit 175 with the two air hoses 42 which communicate with the rear ends of the cylinders 40 and 41, shown at the right in FIGS. 1, 2 and 3. Another port 176 of the valve 173 is connected by a conduit 177 with the hoses 43 which communicate with the forward ends of the cylinders 40 and 41. The two way valve 173 has an exhaust port 178. A pressure regulating valve 180 is provided in the run of conduit 175. Also, pressure relief valves 181 and 181a are provided for each cylinder or bag thereby providing for immediate relief of pressure in connection with the dip in the highway. A pressure gauge 182 is connected by a conduit 183 with the run of conduit 175. Preferably a shut-off valve 184 is provided in the conduit 183.

When this load distributing device is in use and load is being carried by the rear axle 30 the two way control valve 173 will be in the position shown in FIG. 6. In this position forward ends of the cylinders 40 and 41 are open to exhaust through the conduits 43 and 177 and air under a pressure predetermined by the setting of the pressure regulating valve 180 is being supplied by way of the run of conduit 175 and hoses 42 to the forward ends of said cylinders 40 and 41. If the valve 173 is actuated so that conduit 177 receives air under pressure and conduit 175 is open to exhaust, the axle 30 can be lifted so that the wheels 31 and 32 are clear of the ground.

The valve 173 is used for two purposes: (1) To put air on the forward end of the piston in cylinders 40 and 41 to lift up the rear axle or axles. (2) The attachment may weigh 7500 pounds and in order to attach this to the mobile vehicle, the vehicle is backed up to the extension and the air connected and applied to the cylinder to vertically adjust the brackets 36 and 38 in order to align for inserting the pins 37 and 39. A landing gear 63a and 64a disposed on each side of the forward end of the attachment operates to support the forward end of the cantilever attachment when the attachment is disconnected from plate 20.

With reference to FIGS. 1–3: Let it be noted that a prime and fundamental positive requirement is that the distribution of the load to the axle of the extension must be constant and reliably constant under varying road conditions. The inspector is not satisfied to have the load on the axles show a magnitude within the permissible range. To have the load exceed such range even momentarily may do an injury to the pavement and weaken the same which, though not immediately detectable, will subsequently develop into a defect dangerous to traffic and add considerably to the maintenance. Hence, it is the responsibility of the inspectors to be sure that any device whose purpose is to distribute or convert an illegal load into a legal load accomplishes just that, positively and reliably. So concerned is he in attempting to satisfy himself that in making certain that his inspection of a given device designed to operate properly in distributing the load does so operate at all times that, in order to fully observe, he places himself in the vehicle where he can observe the pressure gauge in actual operation measuring the distributed load during a selected road trip. Such has been the inspection trip to which the mechanism of the present invention has been successfully subjected.

By way of illustration and not limitation, the condition of the road highway may be considered where the wheels supporting the rear end of the truck of a heavily loaded mobile vehicle equipped with the mechanism of the present invention have just reached the crest of a dip in the highway and are just about to level off in the direction of travel. Without the correction provided by the present invention of the form shown in FIGS. 1–3, it is manifest that the load carried by the truck rear wheels would be greatly increased until the plane of the axle of the extension reached the same level as that of the axles of said rear wheels. But with applicant's invention, while the axle of the extension of the truck frame will be in a lower horizontal plane than that of the axles of the said truck rear wheels and, nevertheless, in spite of the difference in levels, the pressure on the highway of the wheel of the said extension axle must continue the same as it was just before the said rear wheels reached the crest. The long range of movement of the piston in cylinders 41 and the bell crank leverage in conjunction with the pressure reservoir 170 being slightly greater than that for the traffic allowed load and the control valves operating upon the extension axle provides for such prompt action that the gauge 182 indicates substantially constant pressure in cylinders 40 and 41 in depressing and loading of the extension axle. Thus, the distribution of the load is maintained uniform.

The same situation in reverse order develops when a dip in the highway is encountered.

The embodiment of my invention disclosed in FIGS. 7, 8 and 9 is similar to the one shown in FIGS. 1 to 5, inclusive, except that the load distributing device of this embodiment uses longitudinally spaced apart dual load distributing axles 65 and 66 each with two single wheels 67 mounted on its respective ends instead of using the single axle, dual wheel construction disclosed in FIGS. 1 to 5. Also, the pneumatic load transfer devices shown in FIGS. 7, 8 and 9 differ from those shown in FIGS. 1 to 5.

The structure shown in FIGS. 7, 8 and 9 comprises an adapter plate 68 which is rigidly but removably secured to a conventional outrigger frame 69. The outrigger frame 69 is, in turn, rigidly secured to the rear end of the frame 10 of a mobile vehicle of the type disclosed in FIGS. 1 to 5. The adapter plate 68 is provided with two vertically spaced apart pairs of rigidly attached rearwardly extending perforated hinge plates 70 and 71 positioned near the upper and lower ends of said adapter plate respectively. The two hinge plates of each pair 70 and 71 receive therebetween other vertically spaced apart perforated hinge plates 72 and 73 respectively, which are rigid with the forward end portion of a hollow cantilever member 74. Two vertically aligned hinge pins 75 and 76 respectively pivotally connect the hinge plates 70 and 72 and the hinge plates 71 and 73. This pivotally mounts the cantilever member 74 on the adapter plate 68 for the sidewise swinging movement about the common upright axis of the two hinge pins 75 and 76 but prevents vertical swinging movement of said cantilever member 74 relative to the mobile vehicle frame 10. Preferably, the cantilever member 74 is of hollow fabricated steel construction in the interest of light weight and maximum strength and preferably the forward end portion of said cantilever member 74 is reinforced with side plates 77 and an end plate 78 of a high grade steel.

The rear end portion of the cantilever member 74 is provided with a rigidly attached overhanging end cap 80 of approximately inverted L shape, also preferably formed of high grade steel similar to that used for plates 77 and 78. Two upright pneumatic cylinder assemblies 81 and 81' have their respective upper ends pivotally connected by hinge plates 82 and 82' and pivot pins 83 and 83' with the overhanging end cap 80 of the cantilever member 74. Obviously, air bags may be substituted for said cylinders 81 and 81'. The cylinder assemblies 81 and 81' include downwardly extending piston rods 84 and 84' respectively. The lower ends of the piston rods 84 and 84' are pivotally connected with a cross shaft 85 which is supported by a plurality of shaft hanger plates 86. Preferably spacer tubes 87 are provided on the shaft 85. Also, preferably, the spacer tubes 87 are welded to the plates 86 and extend between said plates 86 and the bearing members at the lower ends of the piston rods 84 and 84'.

The upper ends of the shaft hanger plates 86 are rigidly secured to a horizontal torsion frame F which comprises two side frame torsion bars 88 and 89 and at least two cross bars 90 and 91. The side frame bars 88 and 89 operate as torsion frame bars in the same manner as the side frame bars 33 and 34 of FIGS. 1, 2 and 3. The forward end of the side frame bar 88 is connected by a horizontal pivot pin 93 with a bracket 94 which is rigid with the forward end portion of the cantilever member 74 and projects sidewise therefrom. The forward end portion of the other side frame member 89 is similarly connected by a horizontal pivot pin 95 with a bracket 96 which is rigid with and projects sidewise in an opposite direction from the forward end portion of the cantilever member 74. The two horizontal pivot pins 93 and 95 are coaxial. The pivotal arrangement of the cantilever member 74 and frame F permits horizontal swinging or trailing movement of the cantilever member 74 and said frame F about the common upright axis of pins 75 and 76. Also, it permits vertical swinging movement of the frame F relative to the cantilever member 74 about the common horizontal axis of pins 93 and 95 and prevents vertical swinging movement of the cantilever member 74 relative to the mobile vehicle frame 10 with which it is connected. This makes possible the transfer of load from the mobile vehicle frame to this attachment and at the same time permits trailing movement of the axles 65 and 66 and wheels 67 thereon without scuffing of the tires.

The dual axles 65 and 66 are respectively secured by clamp assemblies 97 to the end portions of two walking beams 98 and 99 which are respectively positioned adjacent to but outwardly from the side frame members 88 and 89. The walking beams 98 and 99 are pivotally mounted midway between their two ends on a cross shaft 100. The cross shaft 100 is mounted on the frame F for vertical rocking movement by a trunnion assembly 101. Said trunnion assembly 101 includes a longitudinally extending pivot member 102 about which the cross shaft 100 rocks. The trunnion assembly 101 is carried by cross frame members which include spaced apart transverse channel bars 103 positioned below and secured to the frame bars 88 and 89, channel gussets 104 positioned on and secured to the bars 103 and to the side frame bars 88 and 89 and contributing to the strength of the structure, trunnion supporting plates 105 secured to and extending downwardly from channel bars 103, and brace plates 108. The cross shaft 100 operates between the plates 105 and the vertical rocking movement of said cross shaft 100 about the pivot member 102 allows for relative up and down movement of the walking beams 98 and 99 at the two sides of the frame F. The pivotal movement of the walking beams about the axis of cross shaft 100 allows for relative up and down movement of the wheels 67 on the two axles 65 and 66.

The load transferring attachment shown in FIGS. 7, 8 and 9 operates in a similar manner to the device disclosed in FIGS. 1 to 5. The pneumatic cylinders 81 and 81' operate in synchronism. The admission of air under pressure through hoses 106 to the upper ends of said pneumatic cylinders 81 and 81' will relieve the rear axles and wheels of the mobile vehicle, with which this attachment is connected, of load by transferring some of this load to the dual axles 65 and 66 and wheels 67 of this attachment and by shifting a lesser proportion of the load from the rear axles and wheels to the front axle or axles and wheels of the mobile vehicle. It is also possible to lift the wheels 67 clear of the ground or roadbed by releasing the air pressure in the upper ends of the cylinders 81 and 81' and admitting air pressure to the lower ends of said cylinders through hoses 107. Obviously, the air control and supply means for air under pressure shown in FIG. 6 and hereinbefore described, can be used in connection with the device shown in FIGS. 7, 8 and 9 by substituting the cylinders 81 and 81' of FIGS. 7, 8 and 9 in place of the cylinders 40 and 41 of FIG. 6 and connecting the upper hoses 106 of FIGS. 7, 8 and 9 with the run of conduit 175 of FIG. 6 and the lower hoses 107 with the conduit 177.

In FIG. 10 is illustrated a modified form of my invention wherein is shown the application of a fluid cylinder 194 pivotally mounted upon a cantilever 185 with its piston rod 186 connected to a bell crank 187 (having lever arms 188 and 189) pivotally mounted in cantilever 185 pivotally connected with connecting link 190 which is pivotally connected to cross beam 192 which in turn is connected to walking beams 193 on each side of the cantilever 185. This is substantially the form of the invention illustrated in FIGS. 1, 2 and 3. The cantilever is designed to keep below the level of the body floor of the vehicle and this fluid cylinder means can be employed beneath the semi-trailer in place of air bags. If desired, the bell crank arm 188 may be bent to secure the desired length both for the said arm as well as for piston rod 186.

The construction and mode of operation of the mechanism embodying my invention eliminates castering so that there is more protection against scuffing of the tire rubber and having the vertical pin also provides for swinging movement in the horizontal plane which eliminates scuffing of the tire rubber in making turns. Furthermore, the construction and mode of operation of the invention provides for a wide magnitude of vertical movement which may be necessary for off the highway travel. The construction provides for vertical movement for the load transmitting axle or axles while the cantilever construction functions as a rigid longitudinal spine like member against vertical movement. Also the construction and mode of operation eliminates the need of shock absorbers to prevent wobbling or shimmy. Especially does the invention provide for a relative constant and uniform assumption of distributed load by the load distributing axle or axles (in case of dual construction). Thus the invention provides a substantial contribution to load distributing mechanism and provides a uniformity of pressure on the load distributing axle or axles that meets the requirements of traffic regulations.

The conditions for use of my invention are many and varied. When the preferred structure of my invention as set forth above, that is, when the ultimate of improvements in load distributing is not required, then the extension with lateral swinging provision for the cantilever would not be required and therefore could be omitted and the structure still retain much of the advantage of my invention. In the event that there would not be extensive curves to negotiate, the sidewise movement (i.e. lateral of longitudinal axis) provision for same could be eliminated and thereby make the cost of construction much less. When there are few curves to be negotiated and these can be made at relatively low speed, the scuffing of the rubber tires would be reduced so that it would not be seriously objectionable.

The construction of my invention with the extension or cantilever part rigid longitudinally with the frame of the mobile vehicle so that no lateral swinging movement would occur and with the load distributing axle of a length to substantially extend across the width of the mobile frame, there practically would be little objectionable castering, if any, so that at low speed any vibration developed would not be serious. With the extension or cantilever addition part rigid with the frame of the mobile vehicle, there would be no vertical movement above the longitudinal plane or axis of the cantilever, only vertical pressure controlled vertical movement between the load distributing axle and the cantilever member. The pressure control would determine the percentage of the load to be assumed by the load distributing axle and the percentage to be transferred to the front axle.

The improvements embodied in this invention have been privately long under study and tests by me in our shop.

Obviously, changes may be made in the forms, dimensions and arrangement of parts of my invention, without departing from the principle thereof, the above setting forth only preferred forms of embodiment. Let it be particularly noted that in eliminating wobbling and shimmying, it is fundamentally important that between the vertical pins 37 and 39 and the load distributing axle, there must be a sufficient distance. This particularly applies where we have the two wheels, each side in a combined unitary structure. For practical operation we have found it must be at least four feet and, under special conditions, it may be less.

I claim:

1. An axle load distributing device for a motor vehicle which has a frame supported on wheel supported axles, comprising a cantilever positioned generally parallel with the motor vehicle frame and rigidly mounted to said frame as respects vertical movement thereto and pivotally connected with said frame as respects horizontal lateral swinging movement; at least one transverse load distributing axle carried by a ground engaging wheel; a torsional frame bar connecting said load distributing axle in spaced relation to a forward end portion of said cantilever, the spaced relation equaling a plurality of times the diameter of the ground engaging wheel of said load distributing axle; and a pneumatic unit operatively disposed between said load distributing axle and said cantilever.

2. An axle load distributing device for a motor vehicle which has a frame supported on wheel supported axles, comprising an elongated cantilever extending rearwardly of the vehicle frame positioned generally parallel with the motor vehicle frame, said cantilever being supported at its forward end only on the vehicle frame and such support being through a connection whereby it is rigid relative to said motor vehicle frame as respects vertical movement but is pivotable relative to said motor vehicle frame as respects horizontal swinging movement; at least one transverse load distributing axle carried by a ground engaging wheel positioned adjacent the rear end of and below said cantilever; a torsional frame bar connecting said load distributing axle in spaced relation to the forward end of said cantilever, said spaced relating equaling a plurality of times the diameter of the ground engaging wheel of said load distributing axle; and a load transmitting pneumatic unit operatively disposed between said load distributing axle and said cantilever.

3. An axle load distributing device for a motor vehicle which has a frame supported on wheel supported axles, comprising a cantilever positioned generally parallel with the motor vehicle frame; vertically spaced regions of pivotal connection connecting upper and lower portions of the forward end of said cantilever with said motor vehicle frame and holding the cantilever against vertical movement with respect to said motor vehicle frame but allowing horizontal swinging movement of the cantilever with respect to said frame; a bell crank lever including a pair of arms positioned on at least one side of the rear end of said cantilever and fulcrumed on said rear end of said cantilever; a load distributing axle adjacent the rear end of said cantilever carried by a ground engaging wheel; a link connecting one arm of the bell crank lever with said load distributing axle; a pneumatic assembly connected between the other arm of the bell crank lever and said cantilever, said pneumatic assembly and said bell crank lever resiliently and directly transmitting load between said cantilever and said load distributing axle; and a torsion frame bar connecting said load distributing axle in spaced relation with a forward portion of said cantilever, said spaced relation being a distance equal at least to a plurlity of times the diameter of the ground engaging wheel of said load-distributing axle.

4. An axle load distributing device for a motor vehicle which has a frame supported on wheel supported axles, comprising a cantilever positioned to the rear of and generally in the longitudinal axis of the vehicle frame; vertically spaced regions of pivotal connection connecting upper and lower portions of the forward end of said cantilever with the rear of said frame, holding the cantilever against vertical movement with respect to said frame and allowing horizontally swinging movement of the cantilever with respect to said frame; a pair of bell crank levers positioned on opposite sides of the rear end of said cantilever and fulcrumed on said rear end of said cantilever; a transverse load distributing axle carried by opposed ground engaging wheels positioned adjacent to and below the rear end of said cantilever; said bell crank levers having two sets of arms and one of said sets of arms being operatively connected to said load-distributing axle; a torsion frame bar connecting said load distributing axle in spaced relation with a forward portion of said cantilever, said spaced relation being a distance equal at least to a plurality of times the diameter of the ground engaging wheels of said load-distributing axle; and a pressure controlled pneumatic load transmitting assembly operatively interposed between said cantilever and the other of said set of arms of said bell crank levers.

5. Axle load distributing means for use with a motor vehicle having a frame supported on wheel supported axles, comprising a cantilever positioned to the rear of and approximately parallel with said motor vehicle frame; vertically spaced regions of pivotal connection pivotally connecting upper and lower portions of the forward end of said cantilever to the rear end of said frame, holding said cantilever against vertical movement relative to said vehicle frame and allowing horizontal swinging movement of said cantilever relative to said frame; at least one transverse load distributing axle carried by opposed ground engaging wheels positioned adjacent to the rear end of said cantilever; connecting levers operatively interposed between the rear end of said cantilever and said load distributing axle; a torsional frame bar connecting said load-distributing axle in spaced relation to a forward end of said cantilever, said spaced relation equaling a distance of a plurality of times the diameter of the ground engaging wheels of said load-distributing axle; a pneumatic load transmitting unit connected with said cantilever and controlling pivotal movement of said levers, whereby load on said cantilever is transmitted to said load-distributing axle through said pneumatic load transmitting unit and said levers; and means controlling the supply of compressed air to said pneumatic load transmitting unit.

6. Axle load distributing means for use with a motor vehicle having a frame supported on wheel supported axles, comprising a cantilever positioned to the rear of and approximately parallel with said motor vehicle frame; vertically spaced regions of pivotal connection connecting upper and lower portions of the forward end of said cantilever to the rear end of said frame holding said cantilever against vertical movement relative to said vehicle frame, but allowing horizontal swinging movement of said cantilever relative to said frame; at least one transverse load distributing axle carried by opposed wheels positioned adjacent to the rear end of said cantilever; a bell crank lever having a pair of arms positioned on a side of the rear end of said cantilever and fulcrumed on said cantilever; a link connecting one arm of said bell crank lever with said load distributing axle; a torsion frame bar connecting said load-distributing axle in spaced relation to the forward end of said cantilever, said spaced relation equaling a distance of a plurality of times the diameter of the ground engaging wheels of said load-distributing axle; and a pneumatic load transmitting device resiliently interposed between the other arm of said bell crank lever and said cantilever.

7. Axle load distributing means for use with a motor vehicle having a frame supported on wheel supported axles, comprising a cantilever positioned to the rear of and inclining upwardly from and approximately parallel with said motor vehicle frame; vertically spaced regions of pivotal connection connecting the forward end of said cantilever to the rear end of said motor vehicle frame holding the cantilever against vertical movement of said cantilever with respect to said vehicle frame but allowing horizontal swinging movement of said cantilever relative to said frame; a transverse load distributing axle carried by opposed ground engaging wheels positioned crosswise of and adjacent to and below the level of the rear end of said cantilever; two transverse brackets projecting laterally in opposite directions from the forward end of said cantilever; two torsion frame bars disposed on opposite sides of said cantilever, the rear end of each torsion frame bar being connected with said load distributing axle in spaced relation with a forward portion of said cantilever, said spaced relation being a distance equal to at least a plurality of times the diameter of the ground engaging wheels of said load-distributing axle; pivot members connecting the forward ends of said torsion frame bars with said brackets; two bell crank levers, one on each side of said cantilever, fulcrumed on the rear end of said cantilever, each bell crank lever having a rearwardly extending arm and a downwardly extending arm; a link connecting the rearwardly extending arm of each bell crank lever with said load-distributing axle; and a generally horizontal pneumatic assembly connected in spaced relation between the downwardly extending arm of each bell crank lever and the forward end of said cantilever.

8. An axle load distributing mechanism for a motor vehicle which has a frame supported on wheel supported axles comprising a wheel base extension in the longitudinal axis of said vehicle frame; vertical pins, one above the other, connecting said extension to the vehicle frame with the extension held rigidly against movement in a vertical plane with respect to the vehicle frame, the pins accommodating lateral swinging movement of the extension; dual load distributing axles, each having opposed ground engaging wheels supporting the axle; a walking beam connecting the axles on each side of the extension; at least one torsional frame bar connecting an intermediate portion of said walking beam in spaced relation to the forward end of said extension, said spaced relation equaling a plurality of times the diameter of the ground engaging wheels of said load-distributing axles; and a pressurized fluid operated unit mounted on said extension operatively connected to said walking beams and said axles for tending to produce when actuated a change in their position relative to said extension.

9. An axle load distributing device for a motor vehicle which has a frame supported on wheel-supported axles, comprising a cantilever positioned generally parallel with the motor vehicle frame, said cantilever being rigid relative to said motor vehicle frame as respects vertical movement and pivotally connected with said motor vehicle frame as respects horizontal swinging movement; at least one transverse load distributing axle carried by ground engaging wheels at opposite ends of the axle positioned adjacent the rear end of and below the end of said cantilever; a torsional frame bar connecting said axle in spaced relation to the forward end of said cantilever, said spaced relation equaling at least a substantial portion of the diameter of the ground engaging wheels of said load-distributing axle; and a load transmitting pneumatic unit operatively disposed between said load-distributing axle and said cantilever.

10. Axle load distributing means for use with a motor vehicle having a frame supported on wheel-supported axles, comprising a cantilever positioned to the rear of and approximately parallel with said motor vehicle frame; upright pivots positioned one above the other rigidly connecting the forward end of said cantilever to the rear end of said frame and holding said cantilever against vertical movement relative to said frame, said pivots allowing horizontal swinging movement of said cantilever relative to said frame; at least one transverse load-distributing axle carried by opposed ground engaging wheels positioned adjacent to the rear end of said cantilever; a bell crank lever having a pair of arms positioned on a side of the rear end of said cantilever and fulcrumed on said cantilever; a link connecting one arm of said bell crank lever with said load-distributing axle; a torsion frame bar connecting said load-distributing axle in spaced relation to the forward end of said cantilever, said spaced relation equaling at least a substantial portion of the diameter of the ground engaging wheels of said load-distributing axle; and a pneumatic load transmitting device resiliently interposed between the other arm of said bell crank lever and said cantilever.

11. Axle load distributing means for use with a motor vehicle having a frame supported on wheel supported axles, comprising a cantilever positioned to the rear of and inclining upwardly from and approximately parallel with said motor vehicle frame; vertical pivot means, one pivot above the other, connecting the forward end of said cantilever to the rear end of said motor vehicle frame and holding said cantilever against vertical movement with respect to said vehicle frame, said vertical pivot means allowing horizontal swinging movement of said cantilever relative to said frame; a transverse load distributing axle carried by opposed ground engaging wheels positioned cross wise of and adjacent to and below the level of the rear end of said cantilever; two transverse brackets projecting laterally in opposite directions from the forward end of said cantilever; two torsion frame bars disposed on opposite sides of said cantilever, the rear end of each torsion frame bar being connected with said load distributing axle in spaced relation with the forward end of said cantilever, said spaced relation being a distance equal to at least a substantial portion of the diameter of the ground engaging wheels of said load-distributing axle; pivot members connecting the forward ends of said torsion frame bars with said brackets; two bell crank levers, one on each side of said cantilever, fulcrumed on the rear end of said cantilever, each bell crank lever having a rearwardly extending arm and a downwardly extending arm; a link connecting the rearwardly extending arm of each bell crank lever with said load distributing axle; and a generally horizontal pneumatic assembly connected in spaced relation between the downwardly extending arm of each bell crank lever and the forward end of said cantilever.

12. An axle load-distributing device for a motor vehicle having a frame supported by wheel supported axles; comprising an elongated cantilever having butt and trailing ends supported on the vehicle through the butt end thereof only, and extending rearwardly of the vehicle frame in a position generally paralleling the frame with the vehicle traveling in a straight path, said cantilever terminating in an unsupported end spaced a substantial distance to the rear of the vehicle frame; means mounting said butt end of the cantilever on the vehicle frame whereby it is supported while being held rigidly relative to the vehicle frame as respects vertical movement, but horizontal swinging movement of the cantilever is accommodated; at least one transverse load-distributing axle trailing the vehicle frame positioned adjacent and below the trailing end of said cantilever, and wheel assemblies mounted on opposite ends of said axle supporting the axle for movement over the ground; a frame bar operatively connected adjacent one end to said load distributing axle and pivotally connected adjacent its opposite end to the butt end of said cantilevers; and a pneumatic unit operatively interposed between said cantilever and said load-distributing axle operable on actuation to produce a transmission of load from the axles of the vehicle through said cantilever to said load-distributing axle trailing the motor vehicle frame.

13. An axle load-distributing device for a motor vehicle having a frame supported on wheel supported axles; comprising an elongated cantilever having butt and trailing ends supported on the vehicle frame through its butt end only, and extending rearwardly of the vehicle frame and inclining upwardly progressing rearwardly from the vehicle frame, said cantilever substantially paralleling the frame with the vehicle traveling in a straight path and terminating in an elevated unsupported trailing end spaced above and a substantial distance to the rear of the vehicle frame; means mounting said butt end of the cantilever on the vehicle frame including vertically spaced regions of pivotal connection connecting upper and lower portions of the butt end of the cantilever to said vehicle frame rigidly holding the cantilever relative to the vehicle frame as respects vertical movement, but accommodating horizontal swinging movement of said trailing end of the cantilever; at least one transverse load-distributing axle supported at opposite ends by ground traveling wheel assemblies, trailing the vehicle frame, and positioned adjacent and below the trailing end of said cantilever; a frame bar with a forward end pivotally connected to the cantilever adjacent its butt end, connecting the load-distributing axle in spaced relation to the butt end of said cantilever, with relative vertical movement of said axle permitted by said bar with respect to the trailing end of the cantilever; and a load transmitting pneumatic unit operatively interposed between said load-distributing axle and said cantilever operable when actuated to urge the load-distributing axle downwardly with respect to the trailing end of the cantilever and with such downward urging to effect a distribution of load from the axles of the vehicle through the cantilever to the load-distributing axle trailing the vehicle frame.

14. An axle load-distributing device for a motor vehicle having a frame supported on wheel supported axles; comprising an elongated cantilever having butt and trailing ends supported on the vehicle frame through its butt end only, and extending rearwardly of the vehicle frame and inclining upwardly progressing rearwardly from the vehicle frame, said cantilever substantially paralleling the frame with the vehicle traveling in a straight path and terminating in an elevated unsupported trailing end spaced above and a substantial distance to the rear of the vehicle frame; means mounting said butt end of the cantilever on the vehicle frame including vertically spaced regions of pivotal connection connecting upper and lower portions of the butt end of the cantilever to said vehicle frame rigidly holding the cantilever relative to the vehicle frame as respects vertical movement, but accommodating horizontal swinging movement of said trailing end of the cantilever; a pair of transverse load-distributing axles, each supported at opposite ends by ground traveling wheel assemblies, trailing the vehicle frame, and positioned adjacent and below the trailing end of said cantilever; at least one walking beam interconnecting the load-distributing axles; a frame bar with a forward end pivotally connected to the cantilever adjacent its butt end, and connected rearwardly of said forward end to said walking beam at a region located between the load-distributing axles, with relative vertical movement of said axles permitted by said bar with respect to the trailing end of the cantilever; and a load transmitting pneumatic unit operatively interposed between said walking beam and said cantilever operable when actuated to urge the load-distributing axle downwardly with respect to the trailing end of the cantilever and with such downward urging to effect a distribution of load from the axles of the vehicle through the cantilever to the load-distributing axles trailing the vehicle frame.

15. The device of claim 14, wherein said frame bar extends rearwardly of said region between said load-distributing axles; and said pneumatic unit comprises an elongated assembly disposed in an upright position rearwardly of said region, connected adjacent its upper end to the trailing end of said cantilever, and adjacent its lower end to said frame bar, with the latter connection being at a point located rearwardly of said region between said load-distributing axles.

References Cited by the Examiner

UNITED STATES PATENTS

| 1,464,680 | 8/1923 | Lassen | 267—15 |
| 1,755,138 | 4/1930 | Stokes | 105—75 X |
| 2,270,390 | 1/1942 | Summers | 280—81 X |
| 2,974,976 | 3/1961 | Lyall | 280—124 |

KENNETH H. BETTS, *Primary Examiner.*

BENJAMIN HERSH, *Examiner.*

W. A. MARCONTELL, *Assistant Examiner.*